(12) United States Patent
Uraki et al.

(10) Patent No.: US 10,033,102 B2
(45) Date of Patent: Jul. 24, 2018

(54) DISPLAY DEVICE

(71) Applicant: Japan Display Inc., Tokyo (JP)

(72) Inventors: Kazuya Uraki, Tokyo (JP); Kenji Tawata, Tokyo (JP); Shinichi Iwasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 125 days.

(21) Appl. No.: 15/010,712

(22) Filed: Jan. 29, 2016

(65) Prior Publication Data

US 2016/0226128 A1 Aug. 4, 2016

(30) Foreign Application Priority Data

Jan. 30, 2015 (JP) ................................. 2015-017219

(51) Int. Cl.
| | | |
|---|---|---|
| *G09G 3/36* | (2006.01) | |
| *H01Q 7/00* | (2006.01) | |
| *G06F 3/147* | (2006.01) | |
| *H01Q 1/24* | (2006.01) | |
| *H01Q 1/44* | (2006.01) | |

(52) U.S. Cl.
CPC ............ *H01Q 7/005* (2013.01); *G06F 3/147* (2013.01); *H01Q 1/243* (2013.01); *H01Q 1/44* (2013.01); *G09G 3/3648* (2013.01); *G09G 2300/04* (2013.01); *G09G 2370/16* (2013.01)

(58) Field of Classification Search
CPC ............ G09G 3/3648; G09G 2300/04; G09G 2370/16; G06F 3/147; H01Q 1/44; H01Q 1/243

USPC .......................... 345/87; 368/47, 64; 235/492
See application file for complete search history.

(56) References Cited

U.S. PATENT DOCUMENTS

| | | | | |
|---|---|---|---|---|
| 6,262,684 | B1* | 7/2001 | Stewart ................. | G06F 1/1626 178/18.04 |
| 6,492,973 | B1* | 12/2002 | Kuroki ................... | G09G 5/006 345/100 |
| 2004/0189625 | A1* | 9/2004 | Sato .................. | G06K 19/07749 345/204 |
| 2005/0225484 | A1* | 10/2005 | Kuramoto .............. | H01Q 1/243 343/700 MS |
| 2006/0103535 | A1* | 5/2006 | Pahlaven ............. | G06K 7/0008 340/572.1 |
| 2007/0139285 | A1* | 6/2007 | Maruyama ....... | G06K 19/07749 343/741 |
| 2008/0204432 | A1* | 8/2008 | Lim ...................... | G06F 1/1616 345/204 |

(Continued)

FOREIGN PATENT DOCUMENTS

| | | |
|---|---|---|
| JP | 2007257483 | 10/2007 |
| JP | 2010102531 | 5/2010 |

(Continued)

*Primary Examiner* — Prabodh M Dharia
(74) *Attorney, Agent, or Firm* — K&L Gates LLP

(57) ABSTRACT

A display device including a display panel is provided. The display panel includes a display area in which a plurality of pixels are arranged, an antenna disposed in a first surface side of the display panel and an adjustment member disposed to be opposed to a part of the antenna. The antenna is configured to form a close-range wireless communication path with a medium in a second surface side of the display panel with the display panel interposed therebetween, and the adjustment member is configured to adjust a characteristic impedance of the antenna.

17 Claims, 9 Drawing Sheets

(56) References Cited

U.S. PATENT DOCUMENTS

| | | | | |
|---|---|---|---|---|
| 2008/0242240 | A1* | 10/2008 | Rofougaran | H04B 1/406 455/86 |
| 2009/0015555 | A1* | 1/2009 | Takashima | G06F 3/016 345/158 |
| 2009/0027327 | A1* | 1/2009 | Urisu | G09G 3/3406 345/101 |
| 2010/0134257 | A1* | 6/2010 | Puleston | G06K 7/0008 340/10.4 |
| 2010/0315907 | A1* | 12/2010 | Tanabe | G04G 9/0064 368/47 |
| 2011/0010607 | A1 | 1/2011 | Raveendran | |
| 2012/0120772 | A1* | 5/2012 | Fujisawa | G04C 10/02 368/64 |
| 2012/0213039 | A1* | 8/2012 | Aizawa | G04R 20/04 368/47 |
| 2013/0154922 | A1* | 6/2013 | Ferren | B60K 35/00 345/156 |
| 2013/0293424 | A1* | 11/2013 | Zhu | H01Q 1/243 343/702 |
| 2014/0106684 | A1* | 4/2014 | Burns | H01Q 1/243 455/78 |
| 2014/0361979 | A1* | 12/2014 | Woo | H01Q 1/243 345/156 |
| 2015/0041786 | A1* | 2/2015 | Li | H01Q 1/44 257/40 |
| 2015/0145736 | A1* | 5/2015 | Lin | H01Q 7/00 343/742 |
| 2015/0309637 | A1* | 10/2015 | Sakuishi | G06F 3/0412 345/174 |
| 2015/0324681 | A1* | 11/2015 | Mats | G06K 19/07766 235/492 |
| 2016/0036122 | A1* | 2/2016 | Debray | G01J 1/42 250/338.1 |
| 2016/0218432 | A1* | 7/2016 | Pope | H01Q 1/243 |
| 2017/0005397 | A1* | 1/2017 | Jiang | H01Q 3/22 |
| 2017/0227807 | A1* | 8/2017 | Hirakata | G02F 1/133308 |

FOREIGN PATENT DOCUMENTS

| | | |
|---|---|---|
| JP | 2011193349 | 9/2011 |
| JP | 2013037653 | 2/2013 |
| JP | 2014160952 | 9/2014 |
| JP | 2014164745 | 9/2014 |
| JP | 2014168262 | 9/2014 |

* cited by examiner

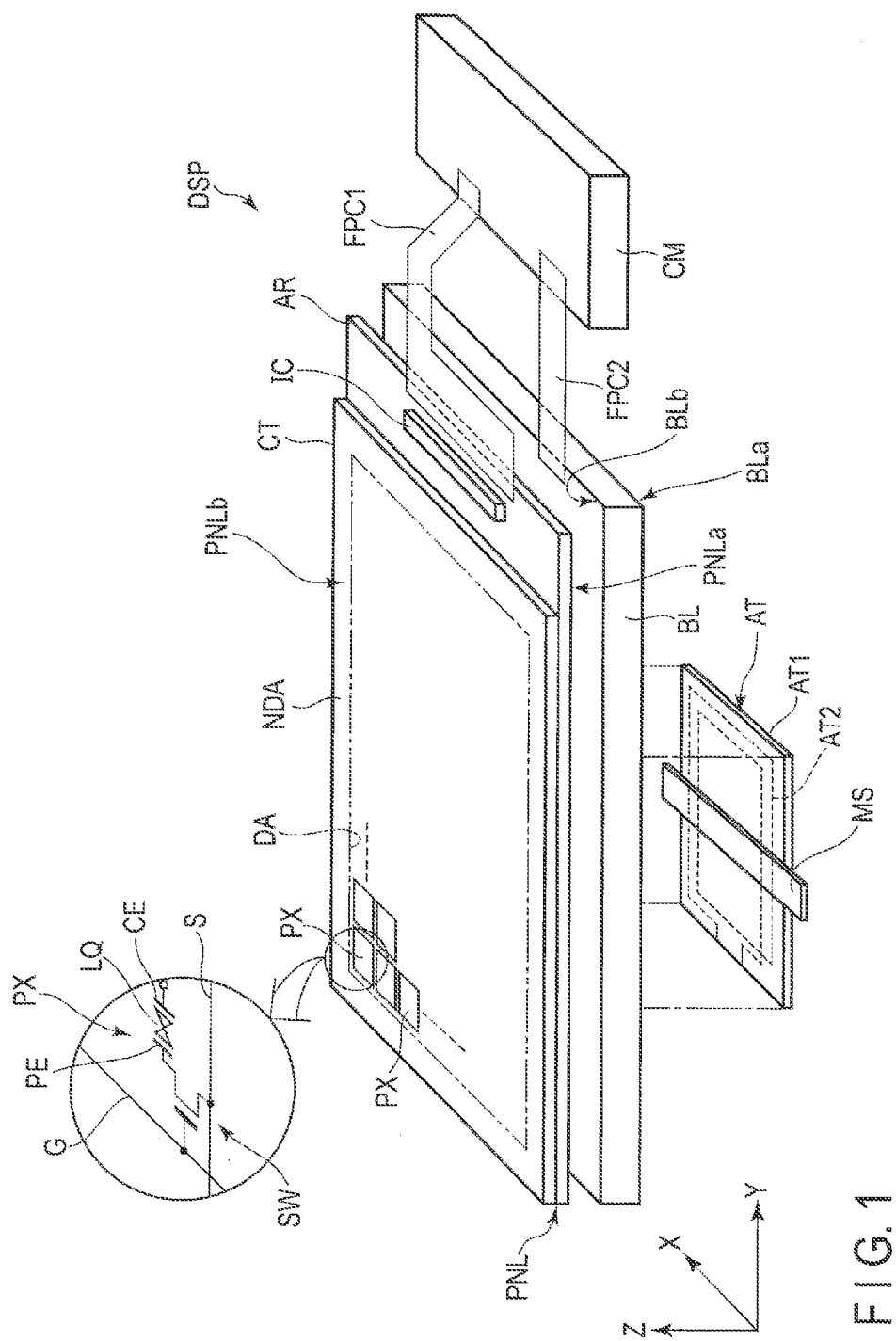
F I G. 1

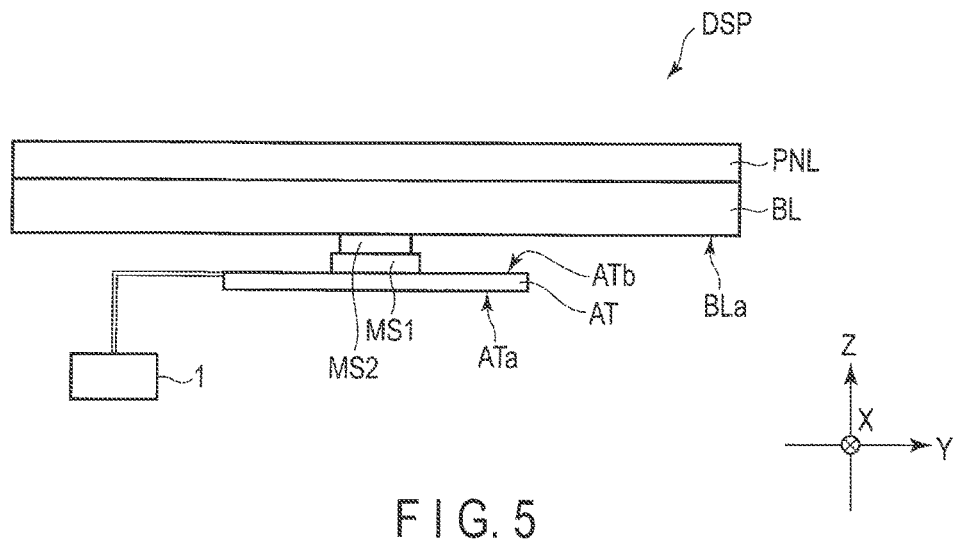
F I G. 5
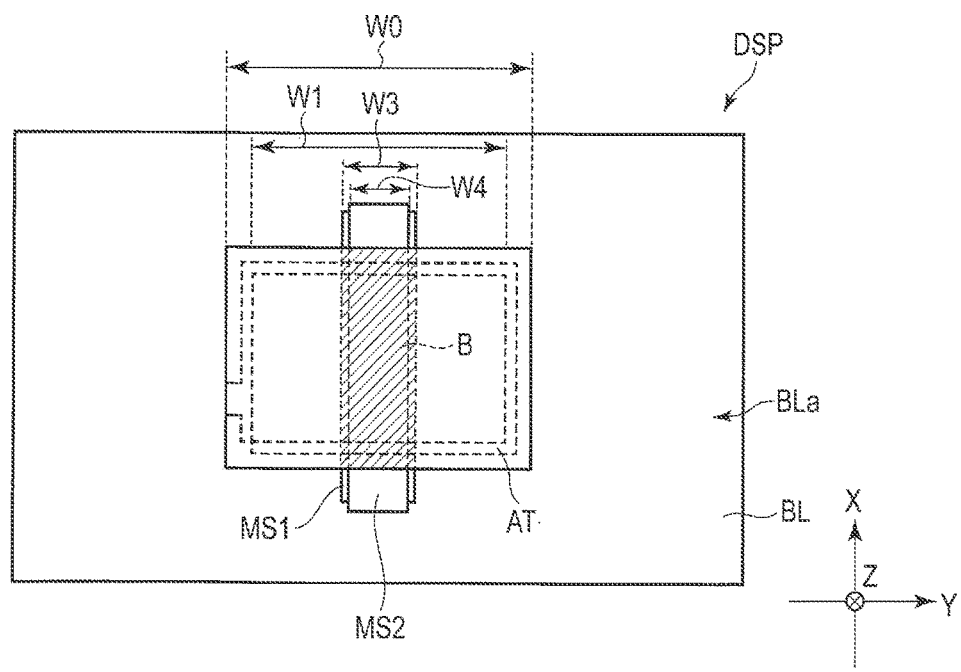
F I G. 6

|  | Drive scheme | Magnetic material | Ratio of impedance to suitable value |  |
|---|---|---|---|---|
| Display panel 1 | VA mode | Not equipped | 100% | (a) |
| Display panel 2 | IPS mode | Not equipped | 54% | (b) |
|  | IPS mode | Equipped | 98% | (c) |

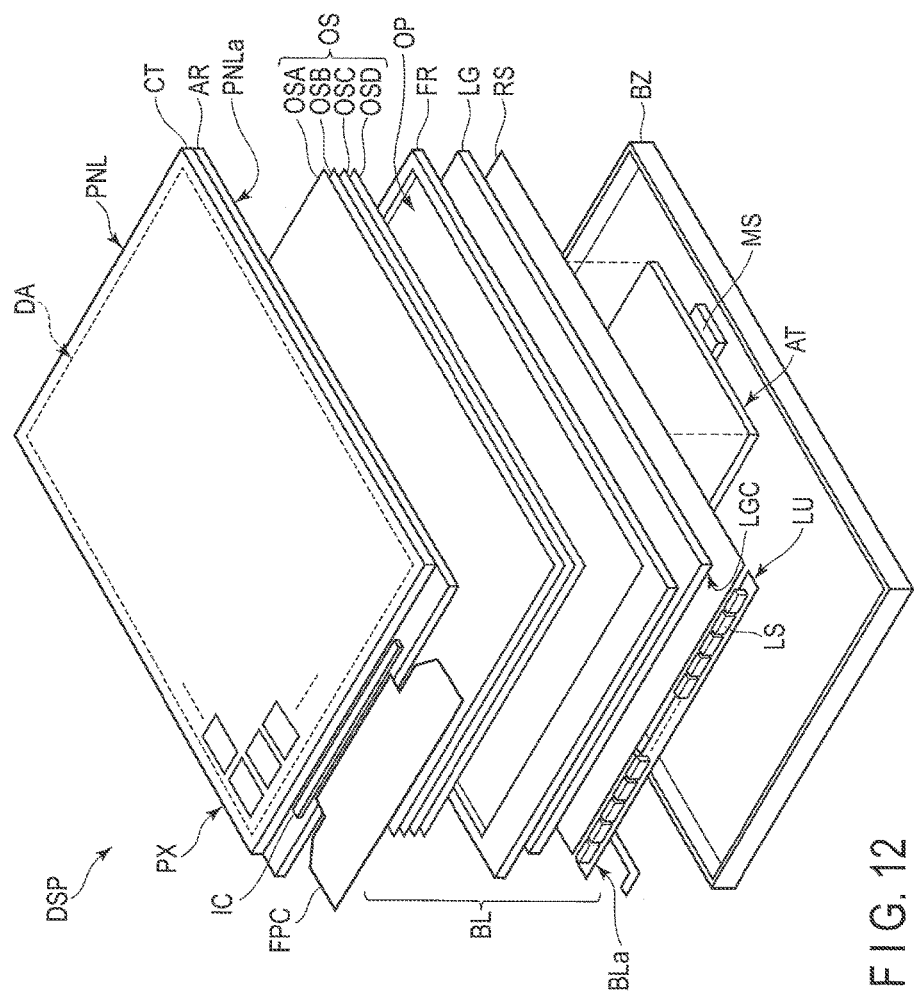
F I G. 12

DISPLAY DEVICE

CROSS REFERENCES TO RELATED APPLICATIONS

The present application claims priority to Japanese Priority Patent Application JP 2015-017219 filed in the Japan Patent Office on Jan. 30, 2015, the entire content of which is hereby incorporated by reference.

FIELD

Embodiments described herein relate generally to a display device.

BACKGROUND

In recent years, display devices such as a liquid crystal display devices have found application in various technical fields. Some display devices have not only a display function but also a close-range wireless communication function. A display device with a close-range wireless communication function includes an antenna for wireless communication in, for example, the rear of its display panel.

SUMMARY

In an embodiment, a display device is provided including a display panel including a display area in which a plurality of pixels are arranged; an antenna disposed in a first surface side of the display panel, the antenna configured to form a close-range wireless communication path with a medium in a second surface side of the display panel with the display panel interposed therebetween; and an adjustment member disposed to be opposed to a part of the antenna, the adjustment member configured to adjust a characteristic impedance of the antenna.

In another embodiment, a display device is provided including a display panel including a display area in which a plurality of pixels are arranged; an antenna disposed in a first surface side of the display panel with a cylindrical coil; and an adjustment member disposed to be opposed to a part of the antenna, the adjustment member configured to adjust a characteristic impedance of the antenna.

In yet another embodiment an illumination device is provided including an illumination unit; an antenna disposed in a first surface side of the illumination unit with a cylindrical coil; and an adjustment member disposed to be opposed to a part of the antenna, the adjustment member configured to adjust a characteristic impedance of the antenna.

Additional features and advantages are described herein, and will be apparent from the following Detailed Description and the figures.

BRIEF DESCRIPTION OF THE FIGURES

FIG. 1 is a perspective view which shows the structure of a display device of a first embodiment and an equivalent circuit thereof.

FIG. 5 shows a display device of a second embodiment as viewed in a Y-Z plane.

FIG. 6 is a plan view which shows the display device of FIG. 5 as viewed from a first surface side of a backlight unit.

FIG. 12 is a perspective view of a variation of the display device of the first to third embodiments.

DETAILED DESCRIPTION

Figure 2:
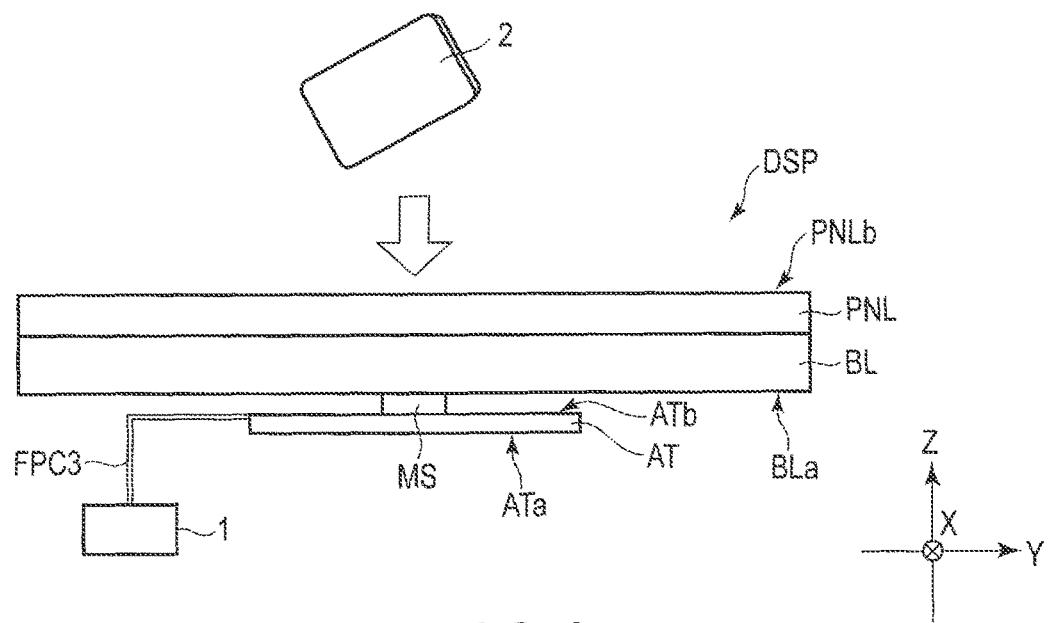
FIG. 2 shows the display device of FIG. 1 as viewed in a Y-Z plane.

In general, according to one embodiment, a display device includes a display panel including a display area in which a plurality of pixels are arranged, an antenna disposed in a first surface side of the display panel, the antenna configured to form a close-range wireless communication path with a medium in a second surface side of the display panel with the display panel interposed therebetween, and an adjustment member disposed to be opposed to a part of the antenna, the adjustment member configured to adjust a characteristic impedance of the antenna.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

Now, a display device DSP of each of first to third embodiments will be described with reference to the accompanying drawings. FIG. 1 is a perspective view which shows the structure of the display device DSP and an equivalent circuit of the first embodiment. In the present embodiment, a liquid crystal display device will be exemplified as the display device. For example, the display device can be used in various devices such as smartphones, tablet computers, feature phones, computers, TVs, in-car devices, and game consoles. Note that the main structures disclosed in the present embodiment are applicable to various display devices such as a self-luminous display device with organic electroluminescent display elements and the like, an electronic paper display device with electrophoretic elements and the like, a display device utilizing micro-electromechanical systems (MEMS), and an electrochromic display device. Hereinafter, a first direction X and a second direction Y are directions crossing each other. A third direction Z is a direction crossing the first and second directions X and Y.

As in FIG. 1, the display device DSP includes, for example, an active-matrix display panel PNL, drive IC chip IC which drives the display panel PNL, backlight unit BL as an illumination unit for the display panel PNL, adjustment member MS, antenna AT, control module CM, and flexible printed circuits FPC1 and FPC2.

The display panel PNL includes a plate-like array substrate AR, and plate-like counter substrate CT opposed to the array substrate AR. In the embodiments, the array substrate AR functions as a first substrate and the counter substrate CT functions as a second substrate.

The display panel PNL is, for example, a transmissive display panel with a transmissive display function which displays an image by selectively passing light from the backlight unit BL. Note that, instead of the transmissive display function, the display panel PNL may be a reflective display panel with a reflective display function which displays an image by selectively reflecting light from the display surface side such as external light and auxiliary light. Furthermore, the display panel PNL may be a transflective display device with both the transmissive and reflective display functions. An illumination unit can be omitted from the structure of a display device DSP including a reflective display panel PNL, but a frontlight unit may be provided with the front surface of the display panel PNL or the display surface side.

The display panel PNL includes a display area DA for image display and a frame-like non-display area NDA around the display area DA. The display panel PNL has a first surface PNLa and a second surface PNLb which are orthogonal to the third direction Z. A plurality of pixels PX are arranged in the display area DA of the display panel PNL. For example, the plurality of pixels PX are arranged in a matrix in both the first and second directions X and Y. The array substrate AR includes, in the display area DA, a plurality of scan lines G extending in the first direction X and a plurality of signal lines S extending in the second direction Y which crosses the first direction X. A pixel is disposed at each crossing point of the scan lines G and signal lines S. In other words, a pixel is surrounded by scan lines G and signal lines S. In the circle of FIG. 1, the circuit structure of a pixel PX is shown. The pixel PX includes, for example, a switching element SW which is electrically connected to the scan line G and signal line S and a pixel electrode PE which is electrically connected to the switching element SW. In this embodiment, the switching element SW is, for example, a thin-film transistor (TFT). The common electrode CE as a common potential is provided with the array substrate AR or the counter substrate CT and is opposed to pixel electrodes PE with a liquid crystal layer LQ interposed therebetween as display function layer.

Note that, although this is not detailed, the display panel PNL corresponds to, for example, a transverse field mode using a transverse field which is substantially parallel to the substrate main surface. In the transverse field mode such as IPS mode, the array substrate AR includes, for example, both the pixel electrode PE and the common electrode CE. The structure of the display panel PNL is not limited thereto. For example, the display panel PNL may correspond to a vertical field mode using a vertical field which is generated in a direction crossing the substrate main surface. In the vertical field mode such as VA mode, the array substrate AR includes the pixel electrode PE and the counter substrate CT includes the common electrode CE. Note that the substrate main surface is a surface parallel to the X-Y plane which is defined by the first and second direction X and Y crossing each other.

The backlight unit BL is disposed in the first surface PNLa side of the display panel PNL and irradiates light onto the display panel PNL. The backlight unit BL includes a first surface BLa and a second surface BLb which are orthogonal to the third direction Z. The second surface BLb is disposed to be opposite to the first surface BLa. The backlight unit BL is opposed to the first surface PNLa of the display panel PNL. The backlight unit BL can be achieved in various models, and detailed structure is omitted here. Note that if the display device is a self-luminous display device of organic electroluminescence, the backlight unit BL may be omitted.

The adjustment member MS is opposed to the first surface BLa side of the backlight unit BL. The antenna AT disposed to the first surface BLa side of the backlight unit BL and is opposed to the backlight unit BL with the adjustment member MS interposed therebetween. That is, the backlight unit BL and the adjustment member MS are disposed between the display panel PNL and the antenna AT, and the antenna AT is disposed in the first surface PNLa side of the display panel PNL with the backlight unit BL and the adjustment member MS interposed therebetween. The antenna AT is a combination of an antenna substrate AT1 and an antenna coil AT2 formed thereon.

The drive IC chip IC is mounted on the array substrate AR. The display panel PNL and the control module CM are connected through flexible printed circuit FPC1. The backlight unit BL and the control module CM are connected through flexible printed circuit FPC2. The drive IC chip IC may be formed on flexible printed circuit FPC1. Furthermore, flexible printed circuit FPC2 may be connected to flexible printed circuit FPC1, and flexible printed circuit FPC1 alone may be connected to the control module CM.

FIG. 2 shows the display device DSP of FIG. 1 as viewed in a Y-Z plane.

As in FIG. 2, the display device DSP includes the antenna AT, adjustment member MS, backlight unit BL, and display panel PNL layered from the bottom in this order, and further includes a driver 1 connected to the antenna AT by a flexible printed circuit FPC3. The driver 1 is connected to the electronic device which accommodates the display device DSP. The antenna is formed in a rectangular sheet-like shape, and includes a first surface Ata and a second surface ATb which are orthogonal to the third direction Z.

In the present embodiment, the antenna AT is conformant with the Near-Field Communication (NFC) standard which is a close-range wireless communication technique operating on frequencies of approximately 13.56 MHz. Note that the model of the antenna AT is not limited particularly, and NFCs such as NFC Type F, NFC Type A, and NFC Type B are applicable thereto. Furthermore, as a close-range wireless communication technique, there is a widely applied Radio-Frequency Identification (RFID) technique using a magnetic field and radio waves. RFID includes general close-range wireless communication techniques, and NFC which is standardized according to certain criteria is included in RFID. The antenna AT of the embodiment is compatible with RFID. RFID includes passive RFID, which does not include a battery and is activated by electromagnetic waves from a reader; active RFID, which includes a battery and produces electromagnetic waves; and semiactive RFID, which is a combination of active RFID and passive RFID. Various antennas used in RFID employ basically the same transmitting/receiving scheme, and are compatible with each other in the present application.

The antenna AT is used for the close-range wireless communication between the display device DSP and, for example, a communication medium 2 such as a smartcard. The communication medium 2 is brought onto the second surface PNLb of the display panel PNL, and the antenna 2 forms a close-range wireless communication path with the communication medium 2 through the display panel PNL.

The adjustment member MS is formed of a material with permeability or permittivity, and is, for example, a radio wave absorption sheet or a metal sheet.

As described later, the backlight unit BL includes a lightguide plate, optical sheet, and the like which are not shown. The lightguide plate and the optical sheet possess permittivity.

The display panel PNL includes, for example, signal lines S and scan lines G as in FIG. 1. The signal lines S and the scan lines G are formed of a metal material and possess permittivity.

Figure 3:
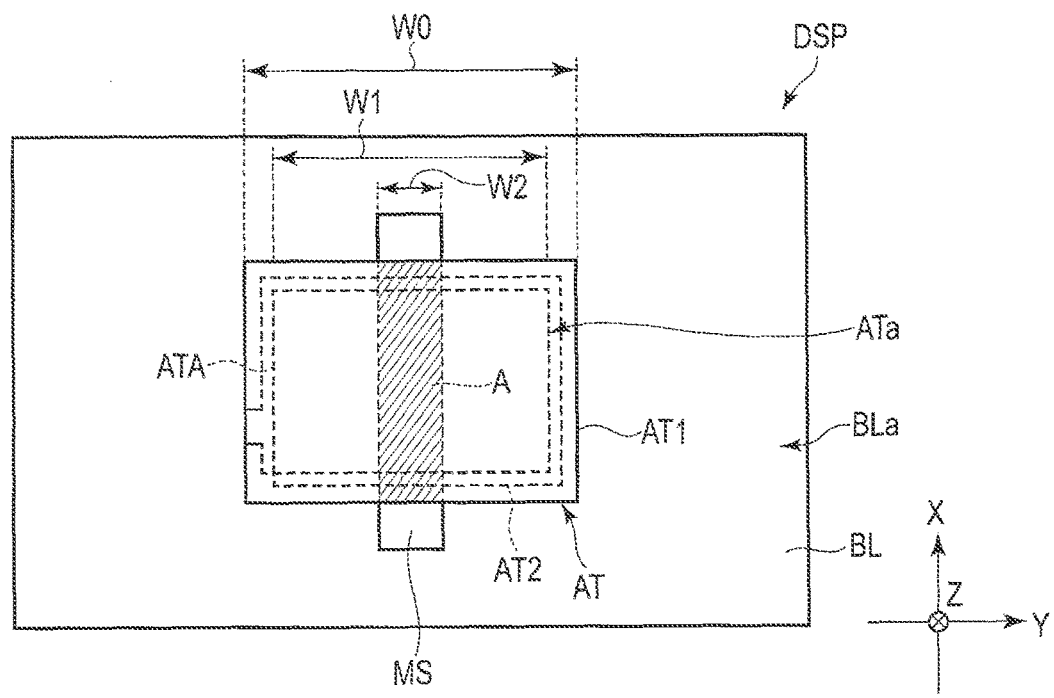
FIG. 3 is a plan view which shows the display device of FIG. 2 as viewed from the first surface side of the backlight unit.

FIG. 3 is a plan view which shows the display device DSP of FIG. 2 as viewed from the first surface BLa side of the backlight unit BL. FIG. 3 shows a positional relationship between the backlight unit BL, adjustment member MS, and antenna AT.

The antenna AT has a width W0 along the section direction Y which is its longitudinal direction. The antenna coil AT2 is formed cylindrically on or inside the antenna substrate AT1. An area ATA inside the inner periphery of the antenna coil AT2 has a width W1 along the second direction Y. The antenna coil AT2 is arranged outside the area ATA. In this embodiment, given that width W0 is 100%, the antenna coil AT2 occupies 10% of width W0 in one side of the antenna AT as being viewed in the second direction Y. That is, along the second direction Y, a gap between the inner periphery of the antenna coil AT2 and the edge of the antenna AT corresponds to 10% of width W0. Thus, width W1 where the antenna coil AT2 is not provided corresponds to 80% of width W0 of the antenna AT.

The antenna AT is arranged such that the entire area of the first surface Ata is opposed to the backlight unit BL. An area in which the antenna AT and the adjustment member MS are opposed is represented in the figure as an area A (hatched part) on the X-Y plane. Area A is formed in a substantial rectangular shape. The adjustment member MS has a width W2 along the second direction Y. The adjustment member MS has a width along the first direction X which is greater than the width of the antenna AT along the first direction X. Here, the width of area A along the first direction X is equal to the width of the antenna AT along the first direction X. That is, a ratio of width W2 to width W0, that is, W2/W0 can be interpreted as a ratio of area A to the antenna AT.

Furthermore, the antenna of the present embodiment is basically formed to have 30-mm short sides along the first direction X, 40-mm long sides (W0) along the second direction Y, and 0.4-mm thickness along the third direction Z. Note that the size of the antenna AT is not limited particularly, and can be determined based on conditions such as an available space for the electronic device and a communication range. If the adjustment member MS is disposed to overlap the antenna coil AT2, the NFC reception performance is decreased. Thus, the adjustment member MS should be arranged to cross the antenna coil AT2. In the example depicted, the adjustment member MS is arranged to cross the antenna coil AT2 extending in the second direction Y or to cross area ATA in the first direction X.

Figure 4A:
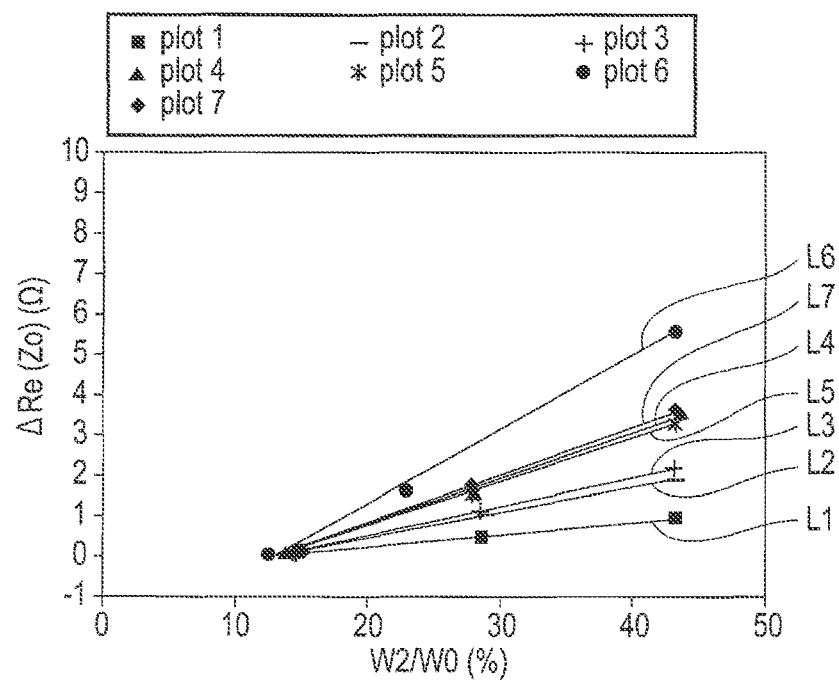
FIGS. 4A and 4B show graphs of relationships between a ratio of a width of an antenna and a width of an adjustment member of FIG. 3 and a change in the characteristic impedance of the antenna.
Figure 4B:
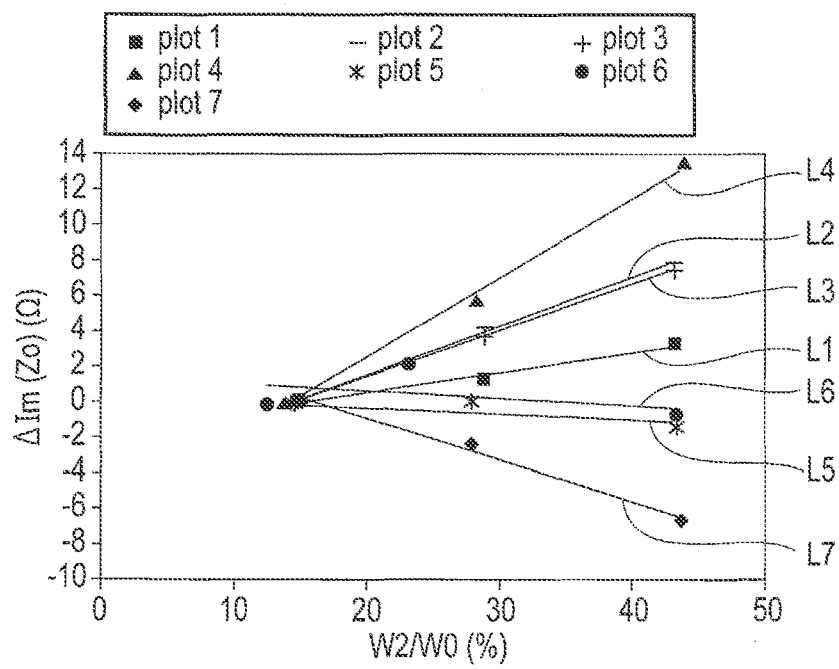

FIGS. 4A and 4B show graphs of relationships between the ratio W2/W0 which is a ratio of width W2 of the adjustment member MS to width W0 of the antenna AT and of FIG. 3 and a change in the characteristic impedance ($\Delta Z_0$) of the antenna AT. The graphs of FIGS. 4A and 4B are obtained from a case where a single adjustment member MS is opposed to the antenna AT as in FIGS. 2 and 3. The characteristic impedance $Z_0$ of the antenna AT is represented as the sum of real part $Re(Z_0)$ and imaginary part $Im(Z_0)$. That is, the change in the characteristic impedance $Z_0$ ($\Delta Z_0$) is represented as the sum of a change in the real part $\Delta Re(Z_0)$ and a change in the imaginary part $\Delta Im(Z_0)$. Here, graph 1 of FIG. 4A is related to the real part of the characteristic impedance and graph 2 of FIG. 4B is related to the imaginary part of the characteristic impedance.

As in FIGS. 4A and 4B, in graph 1, the transverse axis x shows the ratio W2/W0 which is a ratio of width W2 of the adjustment member MS to width W0 of the antenna AT. The vertical axis y shows change $\Delta Re(Z_0)$ of the real part of the characteristic impedance of the antenna AT. Furthermore, in graph 2, the transverse axis x shows the ratio W2/W0 which is a ratio of width W2 of the adjustment member MS to width W0 of the antenna AT. The vertical axis y shows change $\Delta Im(Z_0)$ of the imaginary part of the characteristic impedance of the antenna AT. In graphs 1 and 2, seven types of adjustment members MS are used to measure the characteristic impedance $Z_0$ of the antenna AT.

Plot 1 shows values measured when the adjustment member MS is a first radio wave absorption sheet, and line L1 is an approximate straight line of plot 1. Plot 2 shows values measured when the adjustment member MS is a second radio wave absorption sheet, and line L2 is an approximate straight line of plot 2. Plot 3 shows values measured when the adjustment member MS is a third radio wave absorption sheet, and line L3 is an approximate straight line of plot 3. Plot 4 shows values measured when the adjustment member MS is a fourth radio wave absorption sheet, and line L4 is an approximate straight line of plot 4. Plot 5 shows values measured when the adjustment member MS is a fifth radio wave absorption sheet, and line L5 is an approximate straight line of plot 5. Plot 6 shows values measured when the adjustment member MS is a sixth radio wave absorption sheet, and line L6 is an approximate straight line of plot 6. Plot 7 shows values measured when the adjustment member MS is a silver sheet, and line L7 is an approximate straight line of plot 7.

In graph 1, when the ratio W2/W0 increases, the real part $Re(Z_0)$ of the characteristic impedance of the antenna AT all increases in lines L1 to L7. That is, graph 1 shows that, in the structure shown in FIG. 3, the real part $Re(Z_0)$ of the characteristic impedance increases when the ratio of width W2 to width W0 increases, and the real part $Re(Z_0)$ of the characteristic impedance decreases when the ratio of width W2 to width W0 decreases.

In graph 2, when the ratio W2/W0 increases, the imaginary part $Im(Z_0)$ of the characteristic impedance of the antenna AT tends to increase in lines L1 to L4. When the ratio W2/W0 increases, the imaginary part $Im(Z_0)$ of the characteristic impedance of the antenna AT tends to decrease in lines L5 to L7. Therefore, graphs 1 and 2 show that, in the structure shown in FIG. 3, the change of the imaginary part $Im(Z_0)$ of the characteristic impedance of the antenna AT depends on the material of the adjustment member MS and the ratio W2/W0.

That is, graphs 1 and 2 prove that the real part $Re(Z_0)$ and the imaginary part $Im(Z_0)$ of the characteristic impedance of the antenna AT can be adjusted by setting of the material of the adjustment member MS and area A in which the antenna AT and the adjustment member MS are opposed to each other.

Here, the antenna AT has a suitable characteristic impedance $Z_0$ for certain frequency. However, when the antenna AT is equipped in the display device DSP, the characteristic impedance $Z_0$ of the antenna AT may be shifted from its suitable value by the metal materials of the scan lines G, signal lines S, and the like of the display panel PNL and materials with permittivity and permeability of the light-guide plate, diffusion sheet, and the like of the backlight unit BL. If the driver 1 of the antenna AT is unadoptable to a change $\Delta Z_0$ of the characteristic impedance $Z_0$ as specified, or if a driver 1 of new specific cannot be introduced, a change in the value of the characteristic impedance $Z_0$ should be dealt with in the display device DSP conventionally used.

In the present embodiment, the display device DSP includes the adjustment member MS between the display panel PNL and the antenna AT. The adjustment member MS is formed of a material having permittivity or permeability. The antenna AT is formed to have width W0 in the second direction Y. The adjustment member MS is formed to have width W2 in the second direction Y. Thus, the characteristic impedance $Z_0$ of the antenna AT is adjusted by changing the ratio W2/W0 which is a ratio of width W2 of the adjustment member MS to width W0 of the antenna AT. Thus, even if the characteristic impedance $Z_0$ of the antenna AT is shifted from its suitable value by the materials with permittivity and permeability of the display panel PNL and the backlight unit BL, it can be brought closer to its suitable value by changing the ratio W2/W0.

In other words, the characteristic impedance $Z_0$ of the antenna AT can be adjusted by changing the ratio of area A of the adjustment member MS to the area of the antenna AT. In the present embodiment, the adjustment member MS is formed in a rectangular sheet; however, it can be formed in various shapes. Furthermore, the shape of area A will be changed based on the shape of the adjustment member MS and a positional relationship between the adjustment member MS and the antenna AT, and in that case, the characteristic impedance $Z_0$ of the antenna AT can be adjusted by changing the ratio of area A to the area of the antenna AT. Note that, if the antenna coil AT2 is covered with the adjustment member MS to the unnecessary extent, the control of the characteristic impedance $Z_0$ may be disabled and the reception performance may be decrease. In consideration of a crossing area of the adjustment member MS and the antenna coil AT2, width W2 should be set less than a half of width W1. In other words, gaps between the inner periphery of the antenna coil AT2 and the edge of the antenna AT along the second direction Y at the both sides occupy 20% of width W0, and width W1 is 80% of width W0. Thus, the ratio of width W2 to width W0 should be 40% or less. Furthermore, if width W2 of the adjustment member MS is reduced to the unnecessary extent, the control of the characteristic impedance $Z_0$ does not work efficiently and the attachment of the adjustment member MS becomes weak. Thus, the ratio of width W2 of the adjustment member MS to width W0 of the antenna AT should be 10% or more.

Through experiments, inventors of the present application found that the ratio of width W2 to width W0 should be set between 10 and 20% inclusive.

Furthermore, in the present embodiment, the characteristic impedance $Z_0$ of the antenna AT can be adjusted to a suitable value. Thus, even if a conventional driver 1 is used in a new display device DSP and the specification of the driver 1 does not suit to the characteristic impedance $Z_0$ of the antenna AT, the conventional driver 1 can be used. That is, a setting change of the driver 1 or introduction of a new driver 1 is not required, and the change of the characteristic impedance $Z_0$ of the antenna AT can be dealt with easily and cost-effectively.

Furthermore, in the present embodiment, the antenna AT is incorporated in the display device DSP to establish communication with a communication medium 2 such as a smartcard. The performance of the antenna AT can be maintained by the adjustment member MS, and thus, the incorporation of the antenna AT in the display device DSP can be simplified. Therefore, the close-range wireless communication technique can be applied to the wider technical field of display devices.

As can be understood from the above, the present embodiment can present a display device which can adjust characteristic impedance of an antenna and can perform excellent close-range wireless communication.

FIG. 5 shows a display device DSP of the second embodiment as viewed in a Y-Z plane.

Comparing the second embodiment of FIG. 5 to the above first embodiment, there are two adjustment members between a backlight unit BL and antenna AT in the second embodiment, that is, there are a first adjustment member MS1 and a second adjustment member MS2. The first adjustment member MS1 is disposed in the second surface ATb side of the antenna AT. The second adjustment member MS2 is disposed in the first surface BLa side of the backlight unit BL. The first adjustment member MS1 and the second adjustment member MS2 overlap in the third direction Z. The first adjustment member MS1 and second adjustment member MS2 are formed of a material with permeability or permittivity, and is, for example, a radio wave absorption sheet or a metal sheet. The first adjustment member MS1 and the second adjustment member MS2 have different permeabilities or permittivities.

FIG. 6 is a plan view which shows the display device DSP of FIG. 5 as viewed from the first surface BLa side of the backlight unit BL.

In the present embodiment, the first adjustment member MS1 has a width W3 in the second direction Y. The second adjustment member has a width W4 in the second direction Y. The antenna AT has width W0 in the second direction Y. An area in which the antenna AT and the first adjustment member MS1 are opposed to each other is represented as an area B in an X-Y plane. As area in which the antenna AT and the second adjustment member MS2 are opposed to each other is included in area B. Area B is formed in a rectangular shape. Adjustment member MS1 and adjustment member MS2 each have a width along the first direction X which is greater than the width of the antenna AT along the first direction X. Here, the width of area B along the first direction X is equal to the width of the antenna AT along the first direction X. That is, a ratio of width W3 to width W0, that is, W3/W0 can be interpreted as a ratio of area B to the antenna AT.

Figure 7A:
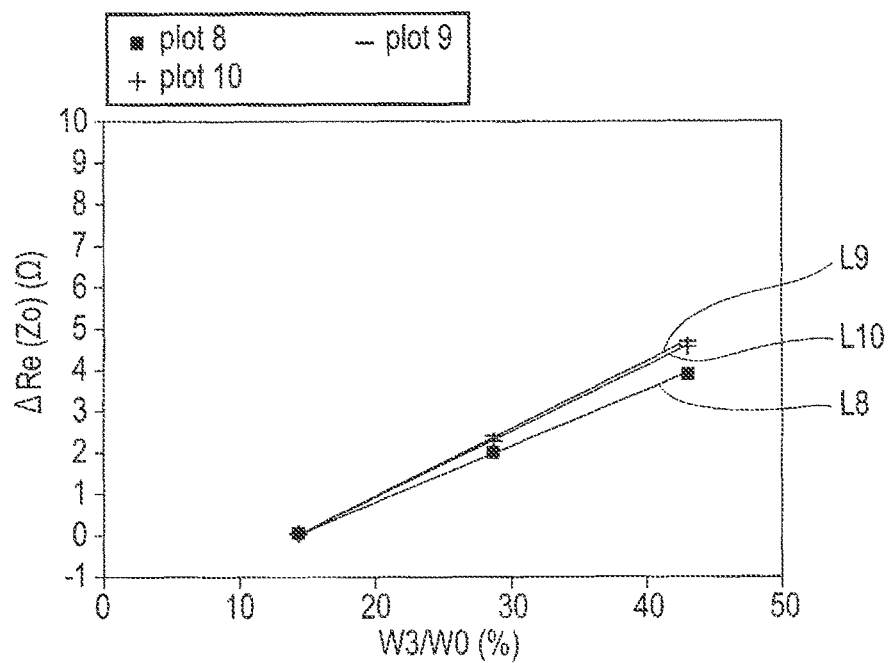
FIGS. 7A and 7B show graphs of relationships between a ratio of a width of a first adjustment member and a second adjustment member to a width of an antenna of FIG. 6 and a change in characteristic impedance of the antenna.
Figure 7B:
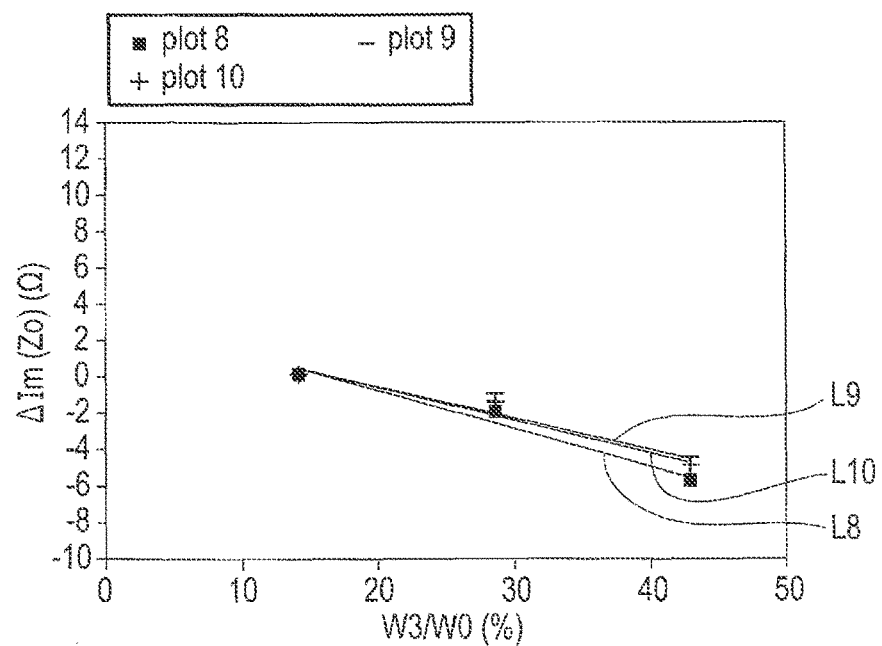

FIGS. 7A and 7B show graphs of relationships between the ratio W3/W0 which is a ratio of width W3 of the first adjustment member MS1 and the second adjustment member MS2 to width W0 of the antenna AT of FIG. 6 and a change in the characteristic impedance ($\Delta Z_0$) of the antenna AT. FIGS. 7A and 7B show graph 3 and graph 4 obtained from a case where the first adjustment member MS1 and the second adjustment member MS2 are layered between the antenna AT and the display panel PNL.

As in FIGS. 7A and 7B, in graph 3, the transverse axis x shows the ratio W3/W0 which is a ratio of width W3 of adjustment member MS1 to width W0 of the antenna AT. The vertical axis y shows the change $\Delta Re(Z_0)$ of the real part of the characteristic impedance of the antenna AT. Furthermore, in graph 4, the transverse axis x shows the ratio W3/W0 which is a ratio of width W3 of adjustment member MS1 to width W0 of the antenna AT. The vertical axis y shows the change $\Delta Im(Z_0)$ of the imaginary part of the characteristic impedance of the antenna AT. In graphs 3 and 4, three combination types of adjustment members MS1 and MS2 are used to measure the change of the characteristic impedance $\Delta Z_0$ of the antenna AT.

Plot 8 shows values measured when the first and second adjustment members MS1 and MS2 are a first radio wave absorption sheet and a silver sheet, and line L8 is an approximate straight line of plot 8. Plot 9 shows values measured when the first and second adjustment members MS1 and MS2 are a second radio wave absorption sheet and a silver sheet, and line L9 is an approximate straight line of plot 9. Plot 10 shows values measured when the first and second adjustment members MS1 and MS2 are a third radio wave absorption sheet and a silver sheet, and line L10 is an approximate straight line of plot 10.

In graph 3, when the ratio W3/W0 increases, the real part $Re(Z_0)$ of the characteristic impedance of the antenna AT all increases in lines L8 to L10. That is, graph 3 shows that, in the structure shown in FIG. 6, the real part $Re(Z_0)$ of the characteristic impedance increases when the ratio of width W3 to width W0 increases, and the real part $Re(Z_0)$ of the characteristic impedance decreases when the ratio of width W3 to width W0 decreases.

In graph 4, when the ratio W3/W0 increases, the imaginary part $Im(Z_0)$ of the characteristic impedance of the antenna AT decreases in lines L8 to L10. That is, when there are two adjustment members of the first adjustment member MS1 and the second adjustment member MS2 between the antenna AT and the backlight unit BL, the real part $Re(Z_0)$ and the imaginary part $Im(Z_0)$ of the characteristic impedance of the antenna AT can be adjusted by changing the ratio W3/W0.

Advantages obtained in the first embodiment can be achieved in the second embodiment as well.

Figure 8:
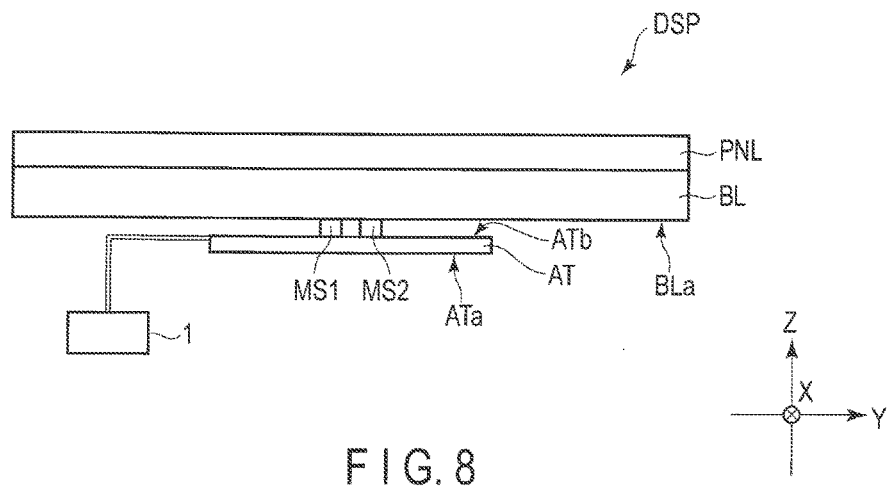
FIG. 8 shows a display device of a third embodiment as viewed in a Y-Z plane.

FIG. 8 shows a display device DSP of the third embodiment as viewed in a Y-Z plane.

Comparing the third embodiment of FIG. 8 to the above second embodiment, a first adjustment member MS1 and a second adjustment member MS2 are arranged side-by-side in the second direction Y in the same plane in the third embodiment. The first and second adjustment members MS1 and MS2 are disposed in the second surface ATb side of the antenna AT.

Figure 9:
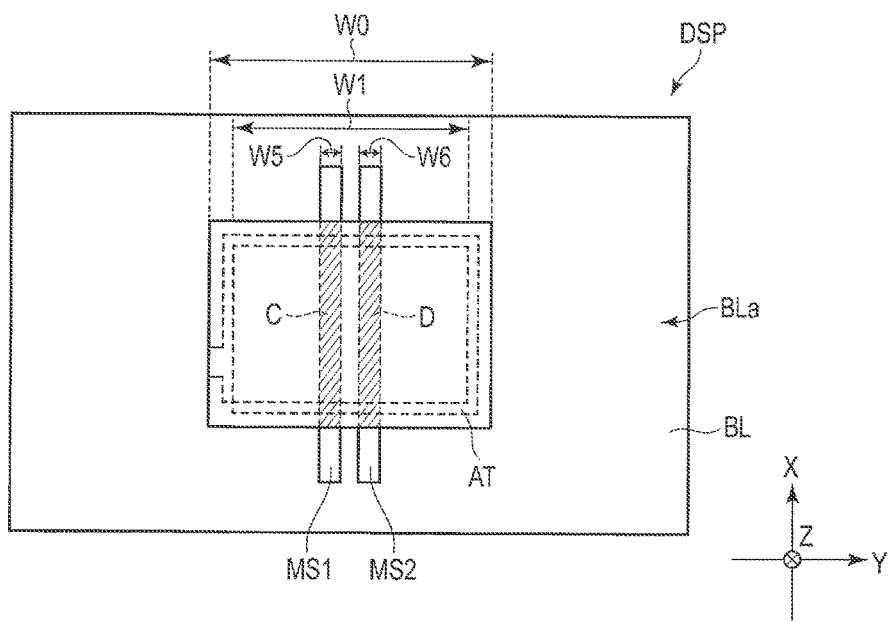
FIG. 9 is a plan view which shows the display device of FIG. 8 as viewed from the first surface side of the backlight unit.

FIG. 9 is a plan view which shows the display device DSP of FIG. 8 as viewed from the first surface BLa side of the backlight unit BL.

An area in which the antenna AT and the first adjustment member MS1 are opposed to each other is represented as an area C in an X-Y plane. An area in which the antenna AT and the second adjustment member MS2 are opposed to each other is represented as an area D in an X-Y plane. Areas C and D are formed in a rectangular shape. The antenna AT has a width W0 in the second direction Y. The first adjustment member MS1 has a width W5 in the second direction Y. The second adjustment member MS2 has a width W6 in the second direction Y. The first adjustment member MS1 and the second adjustment member MS2 each have a width along the first direction X which is greater than the width of the antenna along the first direction X. Here, the width of each of areas C and D along the first direction X is equal to the width of the antenna AT along the first direction X. That is, a ratio of widths W5 and W6 to width W0, that is, (W5+W6)/W0 can be interpreted as a ratio of the sum of area C and area D to the antenna AT.

Figure 10A:
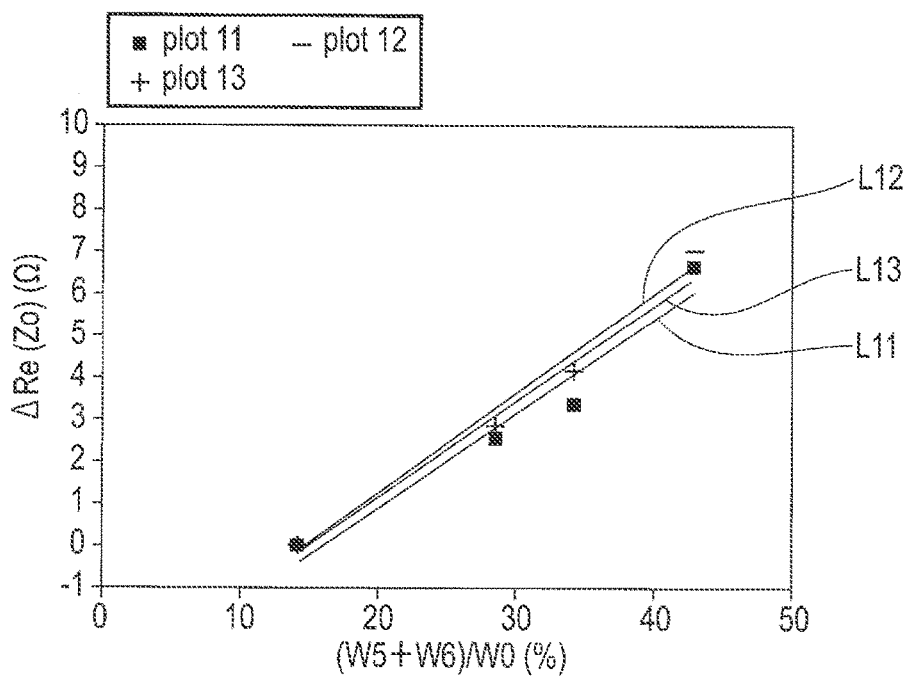
FIGS. 10A and 10B show graphs of relationships between a ratio of the sum of a width W of a first adjustment member and a width of a second adjustment member to a width of an antenna AT of FIG. 9 and a change in the characteristic impedance of an antenna.
Figure 10B:
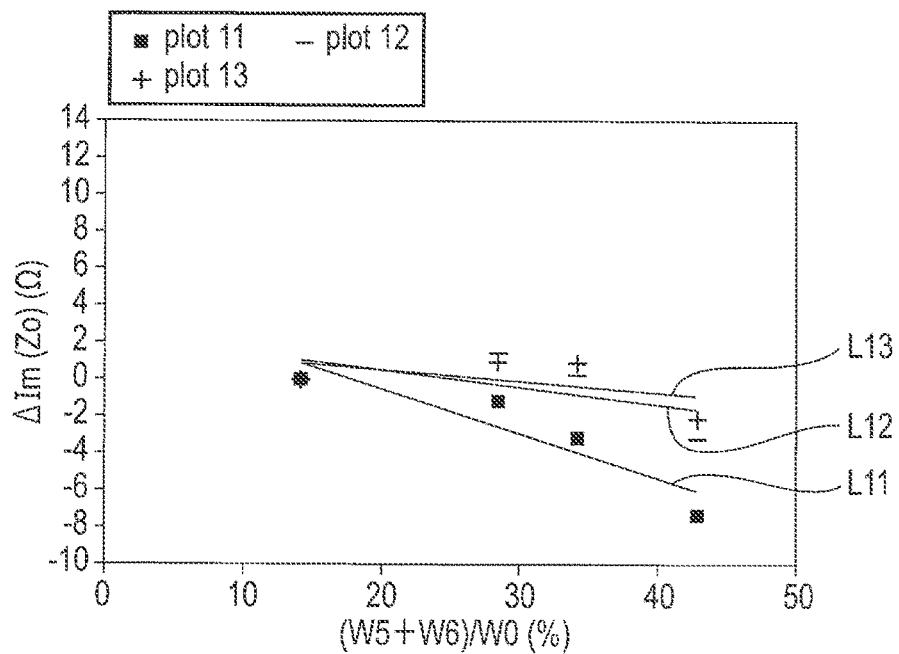

FIGS. 10A and 10B show graph 5 and graph 6 of relationships between the ratio (W5+W6)/W0 which is a ratio of width W5 of the first adjustment member MS1 and width W6 of the second adjustment member MS2 to width W0 of the antenna AT of FIG. 9 and a change in the characteristic impedance ($\Delta Z_0$) of the antenna AT. FIGS. 10A and 10B show graphs obtained from a case where the first adjustment member MS1 and the second adjustment member MS2 are arranged side-by-side in the second direction Y in the same plane between the display panel PNL and the antenna AT.

As in FIGS. 10A and 10B, in graph 5, the transverse axis x shows the ratio (W5+W6)/W0 which is a ratio of the sum of (W5+W6) of adjustment members MS1 and MS2 to width W0 of the antenna AT. The vertical axis y shows the change $\Delta Re(Z_0)$ of the real part of the characteristic impedance of the antenna AT. Furthermore, in graph 6, the transverse axis x shows the ratio (W5+W6)/W0 which is a ratio of the sum of (W5+W6) of adjustment members MS1 and MS2 to width W0 of the antenna AT. The vertical axis y shows the change $\Delta Im(Z_0)$ of the imaginary part of the characteristic impedance of the antenna AT. In graphs 5 and 6, three combination types of adjustment members MS1 and MS2 are used to measure the change of the characteristic impedance $\Delta Z_0$ of the antenna AT.

Plot 11 shows values measured when the first adjustment member MS1 is a first radio wave absorption sheet and the second adjustment member MS2 is a silver sheet, and line L11 is an approximate straight line of plot 11. Plot 12 shows values measured when the first adjustment member MS1 is a second radio wave absorption sheet and the second adjustment member MS2 is a silver sheet, and line L12 is an approximate straight line of plot 12. Plot 13 shows values measured when the first adjustment member MS1 is a third radio wave absorption sheet and the second adjustment member MS2 is a silver sheet, and line L13 is an approximate straight line of plot 13.

In graph 5, when the ratio (W5+W6)/W0 increases, the real part $Re(Z_0)$ of the characteristic impedance of the antenna AT all increases in lines L11 to L13. That is, as with the first and second embodiments, in the third embodiment, the real part $Re(Z_0)$ of the characteristic impedance increases when the ratio of widths W5 and W6 to width W0 increases, and the real part $Re(Z_0)$ of the characteristic impedance decreases when the ratio of widths W5 and W6 to width W0 decreases.

In graph 6, when the ratio (W5+W6)/W0 increases, the imaginary part $Im(Z_0)$ of the characteristic impedance of the antenna AT decreases in lines L11 to L13. That is, when there are two adjustment members of the first adjustment member MS1 and the second adjustment member MS2 arranged side-by-side in the same plane between the antenna AT and the backlight unit BL, the real part $Re(Z_0)$ and the imaginary part $Im(Z_0)$ of the characteristic impedance of the antenna AT can be adjusted by changing the ratio (W5+W6)/W0.

Figures 11, 13:
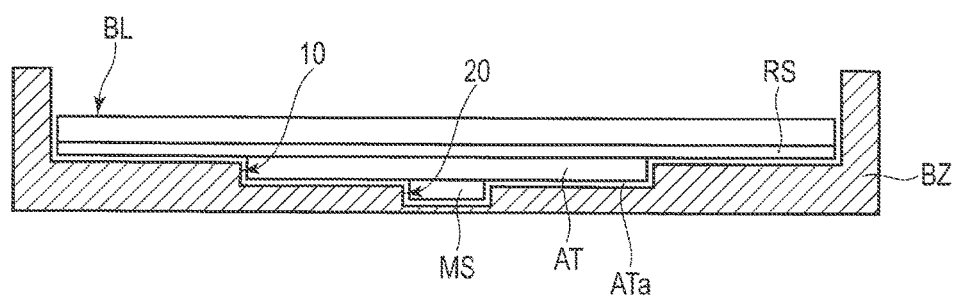
FIG. 11 is a table showing results of measurement of characteristic impedance of the antenna under various conditions.
FIG. 13 is a cross-sectional view which shows a positional relationship of an adjustment member and an antenna in the display device of FIG. 12.

FIG. 11 is a table showing results of measurement of characteristic impedance $Z_0$ of the antenna AT under various conditions. In the table, 100% suitable value of the characteristic impedance of the antenna AT subjected to the measurement is obtained when the NFC resonance frequency is 13.56 MHz.

The first row (a) shows that the characteristic impedance $Z_0$ of the antenna AT becomes 100% suitable for the NFC drive when a display panel 1 of the VA mode is used. The second row (b) shows that the characteristic impedance $Z_0$ of the antenna AT becomes 54% suitable for the NFC drive when a display panel 2 of the IPS mode is used. The third row (c) shows that the characteristic impedance $Z_0$ of the antenna AT becomes 98% suitable for the NFC drive when the display panel 2 of the IPS mode is used with the adjustment member MS disposed between the antenna AT and the display panel PNL as in the first embodiment. That is, the characteristic impedance $Z_0$ of the antenna AT in the display panel 2 with the adjustment member MS becomes closer to 100% suitable value for the NFC drive of the characteristic impedance $Z_0$ of the antenna AT in the display panel 1 driven by a different scheme from that of the display panel 2.

In determination of the width of the adjustment member MS, an initial value of the characteristic impedance $Z_0$ of the antenna AT is measured when the antenna AT is incorporated in the display device DSP, and then a difference between the initial value and the suitable value is obtained. The specific adjustment member MS is determined based on a sign (plus or minus) of the difference between the initial value and the suitable value as to the real part and the imaginary part of the characteristic impedance $Z_0$.

FIG. 12 is a perspective view of a variation of the display device DSP of the first to third embodiments. The display device DSP of FIG. 12 includes the display panel PNL of the first embodiment, and further includes a backlight unit BL and bezel BZ in the first surface PNLa side of the display panel PNL.

In the example depicted, the backlight unit BL includes a light unit LU composed of a plurality of light sources LS, reflective plate RS, lightguide plate LG, frame FR, and optical sheet OS. The optical sheet OS is disposed in the first surface PNLa side of the display panel PNL and includes four layered optical sheets OSA, OSB, OSC, and OSD of the same shape. The light unit LU is opposed to the side surface LGC of the lightguide plate LG. The reflective plate RS is opposed to the lightguide plate LG. In this variation, the antenna AT and the adjustment member MS which are disposed in the first surface BLa side of the backlight unit BL are accommodated in the bezel BZ (or may be referred to as a case). The adjustment member MS is disposed to be opposed to the display panel PNL with the antenna interposed therebetween. The antenna AT and the adjustment member MS are opposed to the lightguide plate LG with the reflective plate RS interposed therebetween. That is, the reflective plate RS is disposed between the antenna AT and the lightguide plate LG. The reflective plate RS is also disposed between the adjustment member and the lightguide plate LG. In other words, the antenna AT and adjustment member MS are disposed to be opposed to the lightguide plate with the reflective plate interposed therebetween. The bezel (case) BZ is shaped as a box with an opening in one of the sides and accommodates the backlight unit BL, display panel PNL, and the like.

FIG. 13 is a cross-sectional view which shows a positional relationship of the adjustment member MS and the antenna AT in the display device DSP of FIG. 12. In the first to third embodiments, the adjustment member MS is disposed between the antenna AT and the backlight BL; however, no limitation is intended thereby. The adjustment member MS may be disposed in the first surface ATa side of the antenna AT which is opposite to the surface of the antenna AT facing the backlight BL. FIGS. 12 and 13 show a case where the adjustment member MS is disposed in the first surface ATa side of the antenna AT.

The adjustment member MS and the antenna AT are disposed between the reflective plate RS and the bezel BZ. That is, the adjustment member MS and the antenna AT are disposed between the backlight unit BL and the bezel BZ. The adjustment member MS is disposed in the first surface ATa side of the antenna AT. In the bezel BZ, a first recess 10 which accommodates the antenna AT is formed. Furthermore, in the recess 10 in the bezel BZ, a second recess 20 which accommodates the adjustment member MS is formed. The second recess 20 is formed inside the first recess 10. That is, unevenness below the backlight unit BL caused by the installation of the antenna AT and the adjustment member MS can be reduced.

Note that only the first recess 10 or the second recess 20 may be formed. Furthermore, the antenna AT and the adjustment member MS may be accommodated in a single recess.

As above, even in the variation in which the antenna AT is applied to the display device DSP, advantages obtained from the above can be achieved.

As can be understood from the above, the present embodiment can present a display device which can adjust characteristic impedance of an antenna and can perform excellent close-range wireless communication. Even if a display device (or a display panel) of a new model may affect the characteristic impedance of a conventional antenna, the adjustment member of the present application can maintain excellent characteristic impedance. The cost of the display device can be suppressed since there is no need of a newly designed antenna or a newly designed antenna driver. The antennas in stock can be used efficiently. Furthermore, by adjusting the characteristic impedance of the antenna to the suitable value, power consumed by the antenna driver can be set to the lowest point which is most sufficient. As a result, the display device of low power consumption can be achieved by the embodiments of the present application.

As described in the embodiments and variation of the present application, the adjustment member MS can be disposed between the display panel PNL and the antenna AT, or the adjustment member MS can be disposed to be opposed to the display panel with the antenna interposed therebetween. Or, both of the above arrangements can be adopted at the same time. The number of the adjustment member MS is not limited to one or two, and three or more adjustment members MS can be used. Furthermore, if the display panel PNL is the reflective type, a backlight unit BL is omitted from its structure. Thus, the adjustment member MS and the antenna AT can directly be disposed in the rear surface of the display panel PNL.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a display panel including a display area in which a plurality of pixels are arranged;
   an antenna disposed in a first surface side of the display panel, the antenna configured to form a close-range wireless communication path with a medium in a second surface side of the display panel with the display panel interposed therebetween, wherein the antenna includes an antenna substrate and an antenna coil disposed on the antenna substrate, and the antenna coil has a plurality of sub portions extending in a first direction; and
   an adjustment member extending in a second direction crossing the first direction and disposed to be partially opposed to at least one of the sub portions in a plan view, the adjustment member configured to adjust a characteristic impedance of the antenna,
   wherein the adjustment member includes a radio wave absorption sheet and a silver sheet, and
   wherein the radio wave absorption sheet and the silver sheet are arranged in the first direction.

2. The display device of claim 1, wherein the adjustment member is disposed in at least one of a position between the display panel and the antenna and a position to be opposed to the display panel with the antenna interposed therebetween, and the adjustment member is in contact with the antenna.

3. The display device of claim 1, further comprising an illumination unit having a third surface and a fourth surface opposed to the display panel to be opposite to the third surface, the illumination unit configured to irradiate light on the display panel,
   wherein at least one of the antenna and the adjustment member is opposed to the third surface side of the illumination unit.

4. The display device of claim 1, wherein the radio wave absorption sheet and the silver sheet have different permeabilities or different permittivities.

5. The display device of claim 1, wherein the radio wave absorption sheet and the silver sheet are arranged to be in the same plane.

6. The display device of claim 1, wherein the display panel further includes a first substrate, a second substrate opposed to the first substrate with a gap therebetween, and a liquid crystal layer held between the first substrate and the second substrate.

7. The display device of claim 1, wherein an area where the adjustment member is opposed to the antenna is formed to be between 10 and 20% inclusive of the area of the antenna.

8. The display device of claim 1, further comprising a bezel with a recess which accommodates the adjustment member and the antenna.

9. The display device of claim 1, further comprising a bezel with a first recess which accommodates the antenna and a second recess which accommodates the adjustment member,
   wherein the second recess is formed inside the first recess.

10. The display device of claim 1, wherein the antenna coil includes a cylindrical coil.

11. A display device comprising:
    a display panel including a display area in which a plurality of pixels are arranged;
    an antenna disposed in a first surface side of the display panel, wherein the antenna includes an antenna substrate and an antenna coil disposed on the antenna substrate, and the antenna coil has a plurality of sub portions extending in a first direction; and
    an adjustment member extending in a second direction crossing the first direction and disposed to be partially opposed to at least one of the sub portions in a plan view, the adjustment member configured to adjust a characteristic impedance of the antenna,
    wherein the adjustment member includes a radio wave absorption sheet and a silver sheet, and
    wherein the radio wave absorption sheet and the silver sheet are arranged in the first direction.

12. An illumination device comprising:
    an illumination unit;
    an antenna disposed in a first surface side of the illumination unit, wherein the antenna includes an antenna substrate and an antenna coil disposed on the antenna substrate, and the antenna coil has a plurality of sub portions extending in a first direction; and
    an adjustment member extending in a second direction crossing the first direction and disposed to be partially opposed to at least one of the sub portions in a plan view, the adjustment member configured to adjust a characteristic impedance of the antenna,
    wherein the adjustment member includes a radio wave absorption sheet and a silver sheet, and
    wherein the radio wave absorption sheet and the silver sheet are arranged in the first direction.

13. The illumination device of claim 12, wherein the illumination unit includes a light source and a lightguide plate opposed to the light source, and
    at least one of the antenna and the adjustment member is opposed to the lightguide plate.

14. The illumination device of claim 13, wherein the illumination unit further includes a reflective plate opposed to the lightguide plate, and
    at least one of the antenna and the adjustment member is disposed in a position to be opposed to the lightguide plate with the reflective plate interposed therebetween.

15. The illumination device of claim 12, wherein the illumination unit further includes a bezel, and
    at least one of the antenna and the adjustment member is disposed in a position between the bezel and the illumination unit.

16. The illumination device of claim 15, wherein the bezel includes a recess which accommodates the adjustment member and the antenna.

17. The illumination device of claim 15, wherein the bezel includes a first recess which accommodates the antenna and a second recess which accommodates the adjustment member, and
    the second recess is formed inside the first recess.

* * * * *